(No Model.)
H. WINKENWERDER.
PIPE OR HOSE COUPLING.
No. 496,468. Patented May 2, 1893.
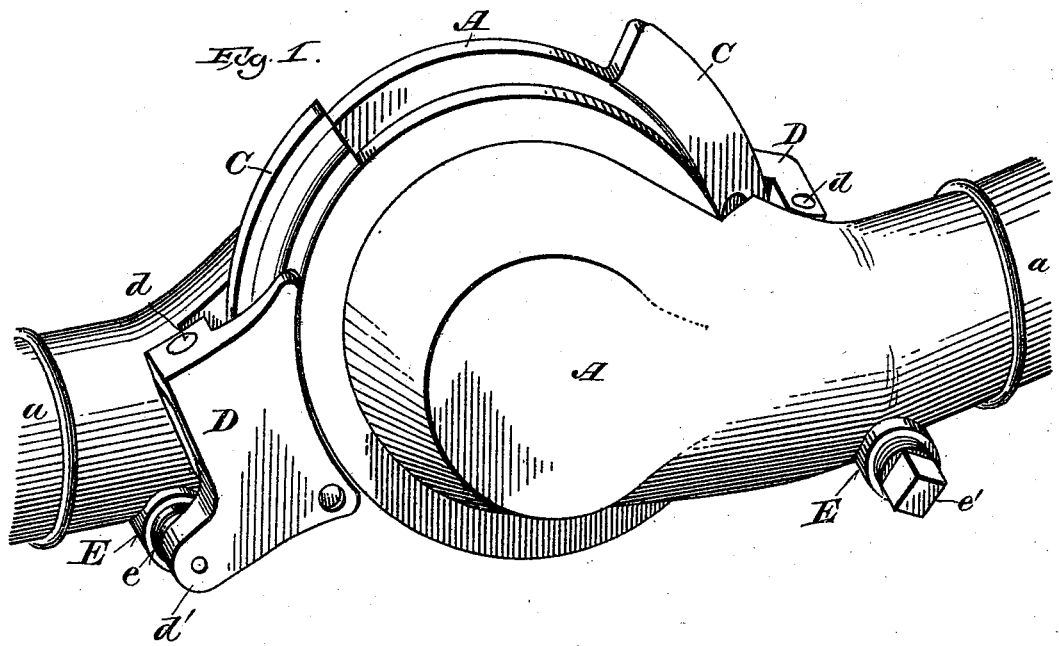
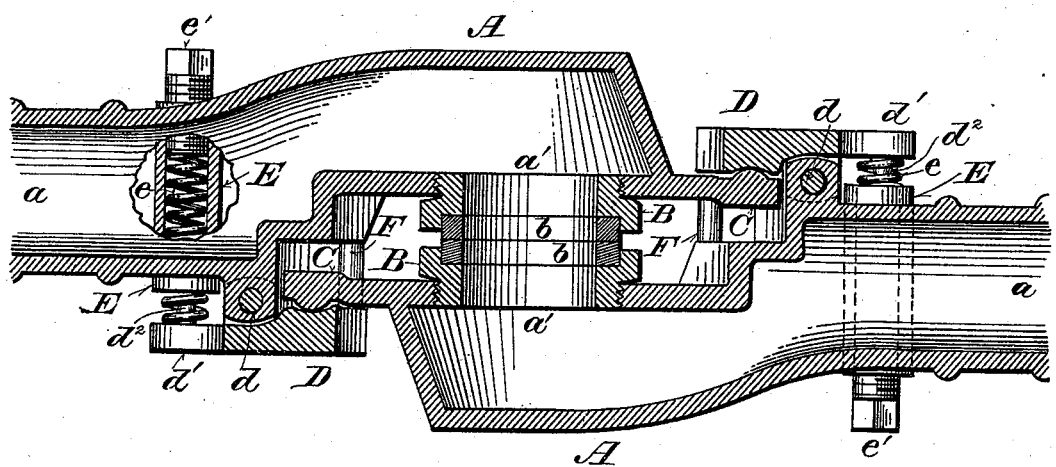
Witnesses:
Inventor:
Henry Winkenwerder
By Winkler, Flanders, Smith, Bottum & Vilas
Attorneys.
THE NORRIS PETERS CO., PHOTO-LITHO., WASHINGTON, D. C.

UNITED STATES PATENT OFFICE.

HENRY WINKENWERDER, OF MILWAUKEE, WISCONSIN, ASSIGNOR TO THE JOHNSON ELECTRIC SERVICE COMPANY, OF SAME PLACE.

PIPE OR HOSE COUPLING.

SPECIFICATION forming part of Letters Patent No. 496,468, dated May 2, 1893.

Application filed May 27, 1892. Serial No. 434,621. (No model.)

*To all whom it may concern:*

Be it known that I, HENRY WINKENWERDER, of Milwaukee, in the county of Milwaukee and State of Wisconsin, have invented certain new and useful Improvements in Pipe or Hose Couplings; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main object of my invention is to produce a durable, effective, easily operated coupling, which will not readily get out of order.

It consists essentially of providing the members of the coupling with interlocking lugs, one of which on each member has a hinge or pivotal connection therewith, and a spring tending to force and hold said hinged or pivoted lug in engagement with the adjacent lug on the opposite member, and means of adjusting the tension of said spring.

In the accompanying drawings like letters designate the same parts in both figures.

Figure 1 is a perspective view of my improved coupling, showing the lugs thereon partially engaged, and Fig. 2 is a horizontal longitudinal section of the same, showing the two members connected with each other.

The coupling is composed of two members, each consisting of a chamber A, formed with a neck $a$ for attachment to pipe or hose, and an opening $a'$ in one side around which is formed or provided a suitable bearing surface. I prefer to employ for this bearing surface a ring, or washer $b$ of vulcanized fiber, or other suitable packing material which will afford, when the two members of the coupling are forced together, a tight joint. This ring or washer I insert in an annular recess in the outer or exposed end of a ring B, which is screwed into, or otherwise secured in the opening $a'$ in chamber A. Each member of the device at the end opposite the neck $a$ is formed, or provided with a segmental lug C, and on the opposite side of the opening $a'$ it is provided with a lug D, which is hinged thereto on a pin $d$ so as to admit of its yielding outwardly from chamber A. Between said lug and the chamber a recess is left for the reception of the lug C on the other member of the coupling. In a transverse sleeve E, or opening formed or provided in each member of the coupling, is inserted a spiral spring $e$, which projects therefrom at one end against an ear, or extension $d'$ of the lug D on the opposite side of its hinge or pivot pin $d$ and bears at its opposite end against a screw plug $e'$ threaded into the opposite end of the sleeve E, or opening in which said spring is placed. This screw plug is squared at its outer end to receive a wrench for turning it in and out for the purpose of adjusting the tension of the spring. The lower ends of the lugs C are tapered and the upper ends of the recesses between lugs D and chambers E are enlarged so as to facilitate the engagement thereof in connecting the members of the coupling with each other. In connecting the members of the coupling, the lug C of each member is inserted inside of the lug D of the other member. The two members are then turned upon their meeting bearing faces until the engaging lugs are brought directly opposite each other, and the lugs C engage with and are stopped by pins F projecting outwardly from each member A across the recess between it and its lug D; the lugs C being thus forced into engagement with the lugs D against the pressure of springs $e\ e$, draw and hold the washers $b\ b$ together with a yielding pressure, thereby producing a tight joint between the members around the openings $a'$ therein. The tension of springs $e$ is adjusted by means of the screw plugs $e'$ to hold the rings $b\ b$ firmly together and maintain a tight joint between the chambers A A against any internal pressure to which they may be subjected, but they are sufficiently yielding to permit of easily engaging and disengaging the lugs in connecting and disconnecting the members.

The ears or extensions $d'$ of lugs D are formed or provided on their inner sides with studs $d^2$ which project into the adjacent ends of springs $e$ and thereby hold them in place.

My improvement is especially applicable to vertical plane couplings, or to that class of couplings in which the members are brought together side by side and joined in a vertical plane lengthwise of the coupling.

I claim—

1. A vertical plane pipe or hose coupling, the two members of which are provided with interlocking lugs arranged to be automatically engaged and disengaged by turning the members in opposite directions parallel with the plane of junction, one lug on each member having a hinge or pivotal connection therewith and a spring tending to force and hold said lug against the adjacent lug on the other member, substantially as and for the purposes set forth.

2. A pipe or hose coupling comprising two members adapted to be brought together side by side and joined in a plane lengthwise of the coupling, and provided with interlocking lugs arranged to be automatically engaged and disengaged by turning the members in opposite directions parallel with the plane of junction, one of which on each member has a hinge or pivotal connection therewith, a spring tending to force said lug against the adjacent lug on the other member and means for adjusting the tension of said spring, substantially as and for the purposes set forth.

3. A vertical plane pipe or hose coupling comprising two members provided with interlocking lugs, the outer lug of each member having a hinge or pivotal connection therewith and a spiral spring inserted in a transverse opening in the corresponding member and bearing at one end against an extension of said lug and at the opposite end against a screw threaded in said opening, substantially as and for the purposes set forth.

4. A vertical plane pipe or hose coupling consisting of two members provided with interlocking segmental lugs in planes approximately parallel with the plane of junction of the members, the outer lugs having hinge or pivotal connections with the corresponding members so as to yield outwardly therefrom and springs held in transverse openings in said members and bearing at one end against extensions of said lugs and at their opposite ends against adjusting screws threaded in said openings, whereby said lugs are forced against the inner adjacent lugs of the opposing members and the meeting bearing surfaces of said members are held together with a yielding pressure, substantially as and for the purposes set forth.

5. A pipe or hose coupling consisting of two members having corresponding bearing surfaces around the openings in their meeting faces, and provided with interlocking lugs arranged to be automatically engaged and disengaged by turning the members in opposite directions parallel with the plane of junction, one of which on each member has a hinge or pivotal connection therewith and means for forcing said lug against the adjacent lug on the other member and holding said bearing surfaces together with a yielding pressure, substantially as and for the purposes set forth.

6. A pipe or hose coupling consisting of two members A A, having corresponding bearings $b\ b$ around the openings $a'\ a'$ in their meeting faces, and provided with interlocking lugs C C and D D, the lugs D D arranged to be automatically engaged and disengaged by turning the members in opposite directions parallel with the plane of junction being hinged or pivoted to said members so as to yield transversely thereto, and springs E E tending to force said lugs D D into engagement with the lugs C C and to hold the bearings $b\ b$ together against internal pressure tending to separate them, substantially as and for the purposes set forth.

In testimony that I claim the foregoing as my own I affix my signature in the presence of two witnesses.

HENRY WINKENWERDER.

Witnesses:
WM. P. POWELL,
CHAS. L. GOSS.